Jan. 3, 1933.   F. J. WATTS ET AL   1,893,189
MOTION PICTURE MACHINE
Filed Aug. 27, 1928   3 Sheets-Sheet 1
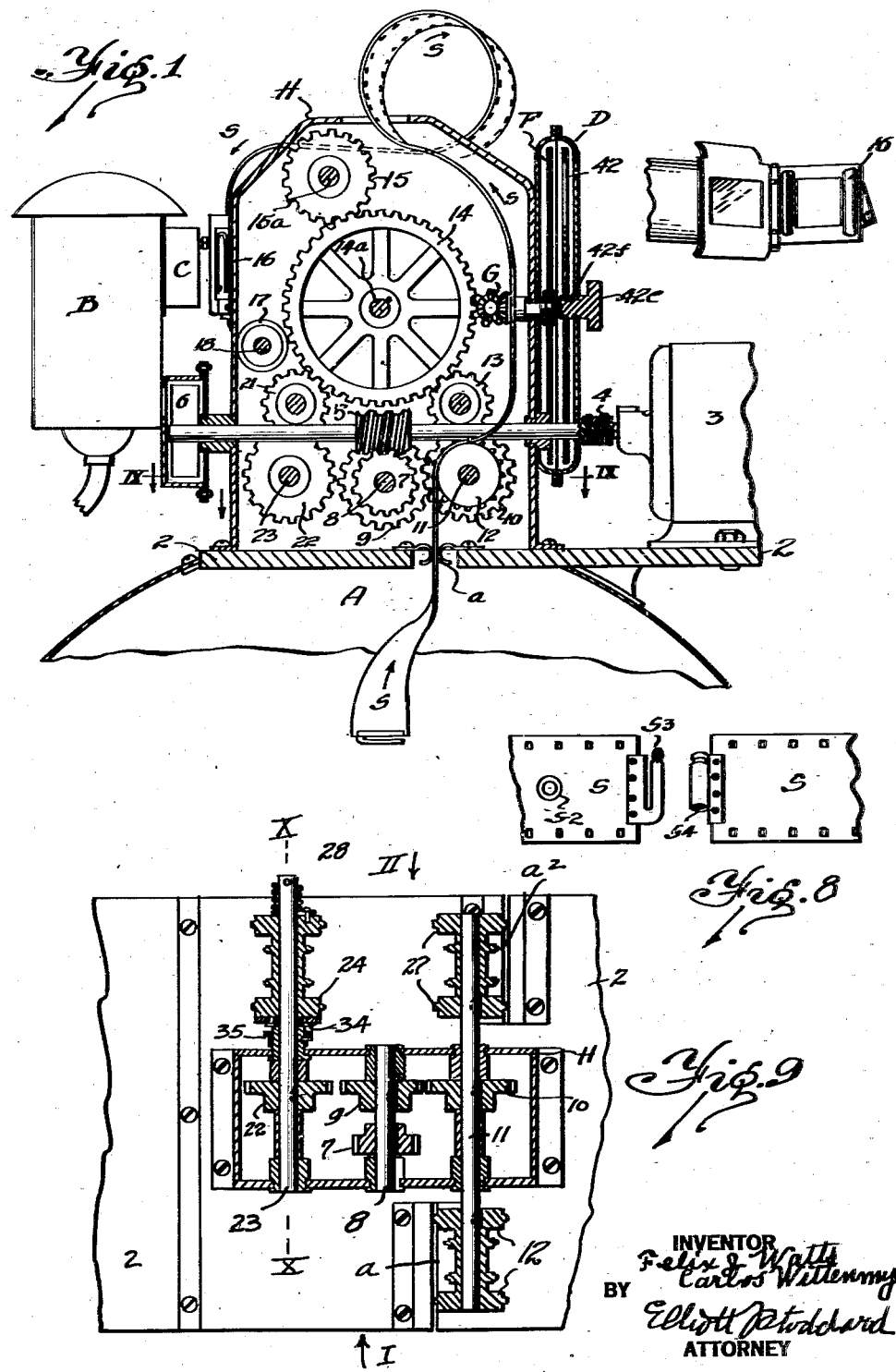

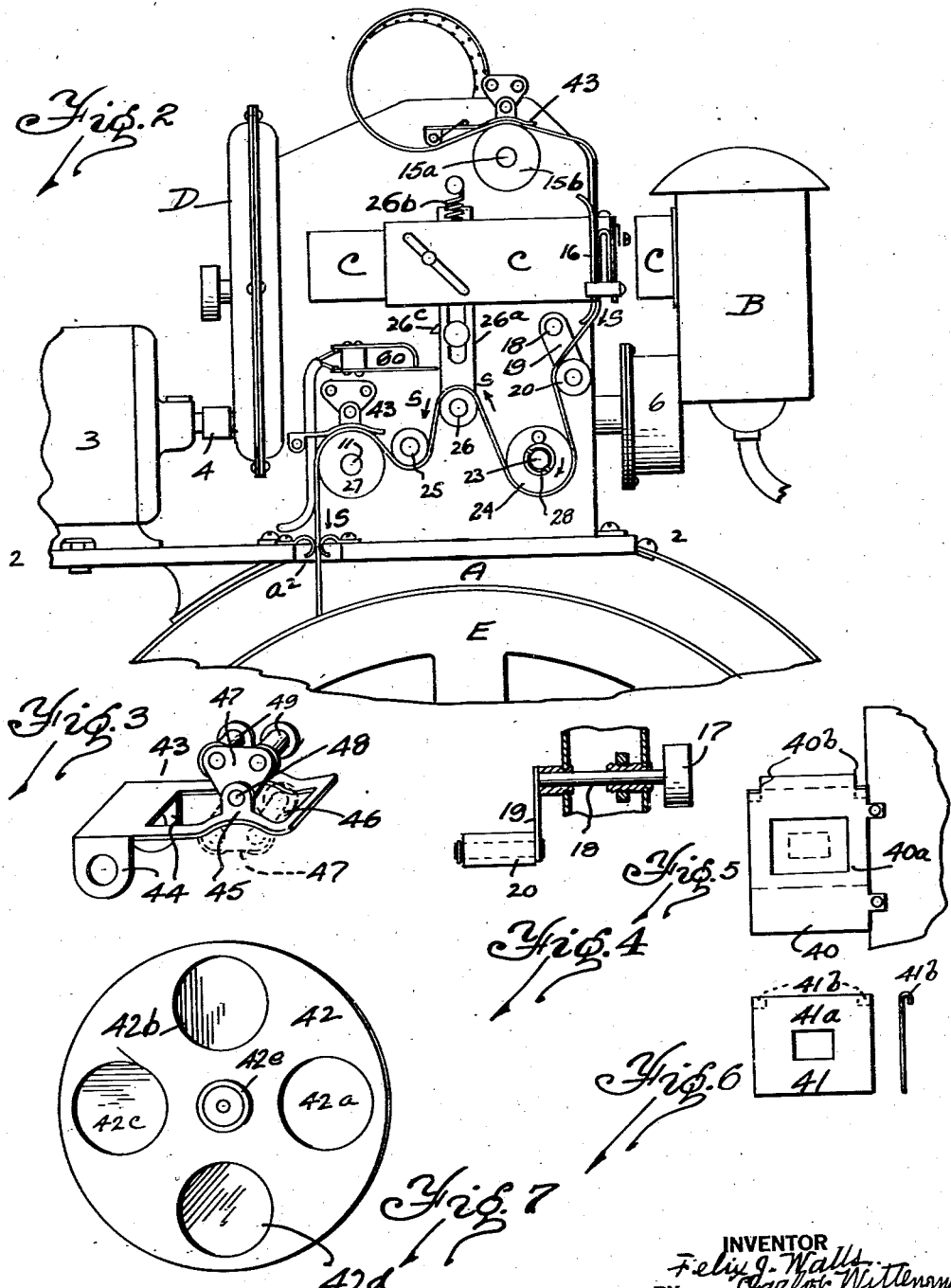

Jan. 3, 1933.  F. J. WATTS ET AL  1,893,189
MOTION PICTURE MACHINE
Filed Aug. 27, 1928  3 Sheets-Sheet 3
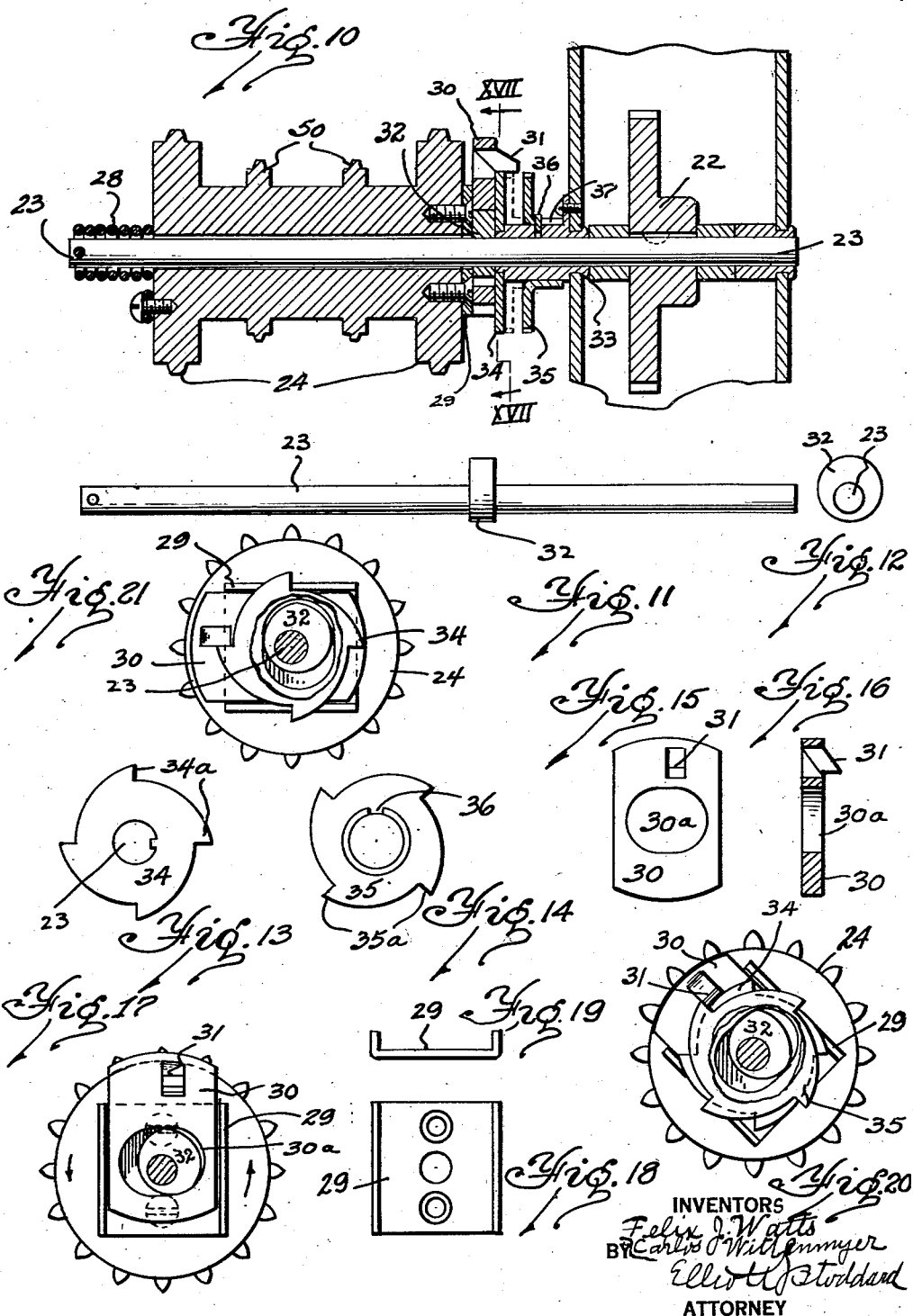

Patented Jan. 3, 1933

1,893,189

UNITED STATES PATENT OFFICE

FELIX J. WATTS, OF BRONSON, AND CARLOS WITTENMYER, OF DETROIT, MICHIGAN

MOTION PICTURE MACHINE

Application filed August 27, 1928. Serial No. 302,242.

Our invention relates to a motion picture machine and an object of our improvements is to simplify and cheapen the construction and render the action smooth, positive and certain.

We secure this object in the apparatus illustrated in the accompanying drawings, in which:

Figure 1 is a side elevation of an apparatus embodying our invention, the casing being cut away to show the interior construction.

Figure 2 is a view similar to Figure 1, the apparatus being turned around to show the reverse side.

Figure 3 is a detail perspective view of the saddle or rider used for holding the strip in engagement with the sprocket wheel.

Figure 4 is a detail view, partly in section, showing the tension adjusting apparatus.

Figure 5 is a detail elevation, showing the frame for the picture secured in place.

Figure 6 is a plan and edge view of a smaller frame that may be adjusted to correspond to a narrower strip.

Figure 7 is a detail view of a disc for changing the color of the picture thrown upon the screen.

Figure 8 is a detail view showing the separated ends of two strips that are to be united.

Figure 9 is a section on the line IX—IX, Figure 1, looking in the direction of the arrows.

Figure 10 is a section on the line X—X, Figure 9.

Figure 11 is a detached view of the driving shaft, looking at the side of the same.

Figure 12 is an end view of the driving shaft.

Figure 13 is a face view of one of the toothed discs for limiting the motion of the sprocket wheels.

Figure 14 is a view, similar to Figure 13, of the other of the two discs.

Figure 15 is a face view of the detent.

Figure 16 is an edge view of the detent.

Figure 17 is a detailed elevational view, showing the detent in place upon the face of the sprocket wheel.

Figure 18 is a face view, and

Figure 19 an end view of the track or guide for the detent.

Figure 20 is a view like Figure 17, the two discs being shown in place and cut away within their peripheries to show the position of coacting parts.

Figure 21 is a view like Figure 20, except that only one disc is shown in position.

A is a cylindrical casing in which is located the reel E for the film strip, from which the strip is drawn and then returned to said casing at another portion thereof.

B is the lantern and C the lenses therefor. D is the casing for the intermittent screen. F is the screen and G indicates the gear wheels through which motion is imparted to the screen F. H is the housing for the mechanism.

The film strip is indicated by the letter S and the adjacent arrows indicate its direction of motion.

2 is the base resting upon the casing A and supporting the apparatus hereinafter described.

3 is an electric motor by which motion is imparted to the movable parts of the apparatus. 4 is a shaft leading from the motor 3 and provided with a worm 5, the threads of which engage the teeth of a worm wheel 7 upon a shaft 8 that extends at right angles to and beneath the shaft 4. 6 is a fan on the end of the shaft 4 opposite to the motor 3 adapted to cause a circulation of air through or around the lantern B to keep the same cool.

9 is a gear wheel on the shaft 8. 11 is a shaft extending parallel to the shaft 8 and resting in stationary bearings. 10 is a gear wheel on the shaft 11, its teeth engaging the teeth of the gear wheel 9. 12 is a sprocket wheel on the end of the shaft 11, adapted to engage and actuate the film strip. 14 is a gear wheel upon the shaft 14a located centrally of the casing H and extending parallel to the shafts 8 and 11. 13 is an idler connecting the wheels 10 and 14. 15 is a gear wheel, its teeth meshing with the teeth of the gear wheel 14. 15a is a shaft upon which the gear wheel 15 is keyed. 16 is the gate. 17 is a knob on the outer end of a shaft 18, which shaft is provided at the other end with an arm 19 (Figs. 2 and 4) carrying a roller 20 at its outer end. 21 (Fig. 1) is a gear wheel having its teeth meshing with the teeth of the gear wheel 14. 22 is a gear wheel keyed upon a shaft 23, extending across the housing H, the teeth of the gear wheel 22 mesh with the teeth of the gear wheel 21. 24 is a sprocket wheel upon the shaft 23, upon which it is adapted to turn to a limited extent. 28 is a torsion spring connecting the sprocket wheels 24 with the shaft 23.

25 (Fig. 2) is a guide roller for the strip. 26 is a second guide roller pivoted to the lower end of a vertically reciprocable rod 26a. 26b is a spring yieldingly urging the rod 26a to the upper limit of its travel. 26c is a lug extending laterally to the rod 26a. 60 is an electric switch interposed in circuit with the motor 3 and lamp B. The switch 60 is adapted to be opened by contact of the lug 26c.

The operation of the apparatus as so far described is as follows:

The motor 3 being set in operation, drives the shaft 8 through the worm wheel 7, actuating by means of the gear wheel 9 the gear wheel 10 to rotate the shaft 11 which actuates the gear wheel 14 through the idler 13. The rotation of the gear wheel 14 turns the shaft 15a by means of the gear wheel 15. The rotation of the wheel 14 actuates the gear wheel 21 which imparts its motion to the gear wheel 22 and shaft 23. The wheel 14 also actuates the screen F through a train of wheels G.

15b is a sprocket wheel upon the shaft 15a.

Before the apparatus is set in motion the film strip is led from the reel E through a tension slot a, over the sprocket wheel 12 with the teeth of which its marginal slots engage; then upward turning in a loop at the top of the machine and engaging the teeth of the sprocket wheel 15b; then down through the gate 16 and engaging the roller 20; then passing over the sprocket wheel 24; then upward over the roller 26; then beneath the rollers 25 and engaging the sprocket teeth of the wheels 27; then passing downward through a slot a2 into the cylindrical casing A. The shaft 18 is turned by the knob 17 to force the roller 20 against the film-strip to regulate the position of the picture. The shaft 18 has considerable friction in its bearing so that it will stay at the place to which it is adjusted.

The sprocket wheels, above referred to, are formed in the shape of spools, having end flanges carrying the sprocket teeth on the peripheries for the standard size film strips; between the ends are provided two other flanges 50 (Fig. 10) having sprocket teeth on their peripheries and located at a distance apart to engage the slots in a narrower film strip.

Over the strip engaging the sprocket wheels 15b and 27 we place a light spring impelled saddle or rider 43, shown in perspective in Figure 3, in order to hold the film in engagement with the sprocket teeth. Said rider is struck-up from light sheet metal and has depending lugs 44, in which are apertures to fit upon a stationary arbor to pivot the rider. 45 is a lug turned up from a side edge of an opening 46, formed in the rider 43. There is a lug upon both sides of the opening 46 and there is a shaft 48 pivoted in said lugs. 47 are triangular plates pivoted on the shaft 48 at one of their corners and bearing rollers 49 joining the other corners to said plates at a distance apart about equal to that of two sprocket teeth. When the narrower film strip is used upon the flanges 50, the plates 47 are turned downward through the opening 46, as shown in broken lines in Figure 3, so that they shall engage said narrower film by means of the rollers 49 and hold the rider 43 away from the larger discs. The sprocket wheels are turned at the same average angular velocity, but the motion of the sprocket wheels 15b, 12 and 27 are uniform, while the motion of the sprocket wheel 24 is intermittent, as hereinafter described.

The disc 42 (Fig. 7) is provided with a series of apertures 42a, 42b, 42c and 42d, having a colorless glass in one and different colored glass in the others. This disc is located on the inner end of a shaft 42f and may be moved by a knob 42e to bring either one of said apertures in the path of projection of the picture, so as to give the required color to the picture upon the screen.

The intermittent movement of the sprocket wheel 24 is secured in the manner hereinafter described and illustrated more particularly in Figures 10 to 19.

29 is a guide-way struck up of sheet metal and screwed to an end face of the sprocket wheel 24, so as to extend diametrically across said face. 30 is a detent fitting and adapted to reciprocate in the guide 29. The detent 30 may also be made of sheet metal and have the tooth 31 struck up from the material thereon, near one end of said detent. 30a is an opening formed through the detent 30, having its ends opposite each other horizontally, bounded by semi-circular walls. Longitudinally of the detent, the opening 30a is of the width equal to a diameter of the circle of the wall of a horizontal end, but transversely of the detents the aperture 30a is of greater extent. The shaft 23 is provided with an eccentric 32 which engages in the opening 30a, so that any relative angular motion thereof shall actuate the detent 30 in the guide 29.

33 is a stationary sleeve surrounding the shaft 23. 34 is a toothed disc keyed or splined upon the end of the sleeve 33. 35 is a second disc upon the sleeve, adapted to slide longitudinally thereof, but prevented from rotation on said sleeve, by means of a slot 36 engaging a pin extending from said sleeve. The discs 34 and 35 are each provided with four teeth 34a and 35a and are so located angularly upon the sleeve, that the teeth 35a are midway between the teeth 34a.

The operation of the intermittent motion of the sprocket wheel 24 is as follows:

The tooth 31 engages the radial face of a tooth 34a of the disc 34 to hold the sprocket wheel 24 stationary. The shaft 23, being rotated by the gear wheel 22, turns in the sprocket wheel 24, torsioning the spring 28.

The turning of the shaft 23 relative to the sprocket wheel turns the eccentric 32 in the slot 30a and forces the detent to a position at which the tooth 31 is disengaged from the tooth 34a. The sprocket wheel 24 is then turned by the spring 28 much faster than the shaft 23 and eccentric 32, so that the tooth 31 is drawn inwards by the relative motion to engage the next one of the teeth 34a. The turning of the wheel 24 draws the film-strip through the gate against the frictional resistance thereof and positions the next picture.

The disc 35 is located at a position out of the path of the tooth 31 when the standard sized film is used. If it is desired to use the narrower film-strip with a larger number of intermittent motions the disc 35 is moved up against the face of the disc 34, so as to bring its teeth 35a in the line of travel of the tooth 31 so that the teeth of both of the discs 34 and 35 will be engaged as above described, alternately, and there will be eight instead of four intermittent motions in each revolution of the sprocket wheel 24. Thus the two discs 34 and 35 taken together constitute a ratchet mechanism adjustable as to the distance between its teeth, coacting with said pawl to define the motion of said revoluble part and their teeth constitute spaced engaging portions for stopping and releasing said revoluble part, and moving the disc 35 into engaging position, or removing it, adjust the distance apart of the engaging portions.

The detent 30 constitutes a pawl and the discs 34 and 35 a ratchet in a pawl and ratchet mechanism.

40 (Fig. 5) is a frame having an opening 40a adapted to the standard sized film and having its upper corners cut away at 40b. 41 (Fig. 6) is an auxiliary frame having an opening 41a therein adapted to the picture of the narrower films. The frame 41 has its upper corners turned over at 41b to engage the cut away corners 40b of the frame 40 to hold the former in place against the surface of the latter, as shown by broken lines in Figure 5.

When a strip of film has about run through the apparatus a button S2, (Fig. 8) affords a resistance to its motion and the strip is tightened drawing down on the roller 26 and rod 26a until the lug 26c engages the switch 60 and breaks the circuit through the motor and lamp, stopping the apparatus and extinguishing the lamp.

S3 (Fig. 8) is a pin secured to the end of a film strip and extending parallel to the end edge, and S4 is a similarly located socket secured to the end of another strip. The latter is slid over the former to join the two strips. If desired the arrangements of the parts may be such that the device for joining the film-strips may offer enough resistance to the motion of the strip to tension the same and break the actuating circuit as above described.

The roller 26, rod 26a and spring 26b serve to prevent any slack in the film-strip between the sprockets 24 and 27.

The outer ends of the slots $a$ and $a^2$ are open so that the strip S may be slid in edgewise. Thus a strip may be removed and replaced at any time during its progress through the machine.

What we claim is:

1. In combination with an apparatus of the kind described, a strip actuating wheel consisting of two discs parallel and spaced from each other and two intermediate discs of less diameter than the first named discs, a rider adapted to engage over the strip upon the discs of greater diameter and having a part adapted to be adjusted to engage over a strip upon the disc of lesser diameter, said rider consisting of a plate cut out to form an aperture between its edges and a part adapted to engage the discs of lesser diameter pivoted to said rider to swing through said aperture.

2. In an apparatus of the kind described, having a gate and a film passing through said gate, a revoluble part adapted to actuate said film through said gate, means for yieldingly actuating said part to revolve the same, a catch-and-release mechanism adapted to cause an intermittent angular motion of said part of determined extent and a piece, forming a part of said mechanism, adjustable at will to cause an angular motion of a different extent.

3. In an apparatus of the kind described, the combination of a film-strip-moving part, a second part, a resilient means between said parts through which the first named part is actuated by said second part, a piece adapted to be intermittently engaged with and disengaged from the first named part to cause a definite angular motion of the same and mechanism actuated by the relative motion of said parts adapted to affect the engagement and disengagement of said first named part and said piece for the purpose described.

4. In an apparatus of the kind described, the combination of a film-strip-moving part, a second part, a resilient means between said parts through which the first named part is actuated by said second part, and means controlled by the relative positions of said parts for releasing and stopping the first named part and means consisting of a stop adapted to be inserted at will into the line of travel of said releasing and stopping means to secure a desired extent of angular motion of said part.

5. In an apparatus of the kind described, the combination of a film-strip-moving part, a second part, a resilient means between said parts through which the first named part is actuated by said second part, a pawl and ratchet apparatus mechanism adapted to be actuated by the relative motion of said parts to operate said pawl and ratchet apparatus to cause a determined extent of angular motion of said first part and an additional ratchet adapted to be moved at will into position to be engaged by said pawl to vary the extent of said angular motion.

6. In an apparatus of the kind described, a strip-actuating wheel consisting of two discs parallel and spaced from each other and two discs of less diameter, located between and parallel to the first named discs, a rider adapted to engage over the strip upon the discs of greater diameter, a part upon said rider adapted to move toward and away from the centers of said discs between the first named discs and to engage over a strip upon the discs of lesser diameter for the purpose described.

7. In an apparatus of the kind described, a revoluble part adapted to move the film-strip, a shaft, a pawl adapted to reciprocate on said part transversely thereof, said shaft having an eccentric engagement with said pawl whereby relative movement of said part and shaft shall reciprocate said pawl and a ratchet adapted to be engaged and released by said pawl.

8. In an apparatus of the kind described, a revoluble part adapted to move the film-strip, a shaft, a pawl adapted to reciprocate on said part transversely thereof, said shaft having an eccentric engagement with said pawl whereby relative movement of said part and shaft shall reciprocate said pawl and a ratchet mechanism adjustable as to the distance between its teeth coacting with said pawl for the purpose described.

9. In an apparatus of the kind described, the combination of a film actuating part, means for producing a yielding actuation of said part and means having spaced engaging portions for stopping and releasing said part said engaging portions being adjustable as to their distance apart as and for the purpose described.

10. In an apparatus of the kind described, the combination of a sprocket wheel, a shaft extending coaxially through said wheel and angularly movable relative thereto, a spring connecting said wheel and shaft eccentrically, a pawl adapted to reciprocate diametrically on said wheel, and an eccentric engagement between said shaft and pawl, substantially as and for the purpose described.

11. In an apparatus of the kind described, the combination of a sprocket wheel, a shaft extending coaxially through said wheel and angularly movable relative thereto, a spring connecting said wheel and shaft eccentrically, a pawl adapted to reciprocate diametrically on said wheel, and an eccentric engagement between said shaft and pawl, a stationary stop adapted to be engaged by said pawl when moved to an outer position by said eccentric, and a second stop angularly spaced from the first stop and adapted to be moved into and withdrawn from the travel of said pawl in said position, substantially as and for the purpose described.

In testimony whereof, we sign this specification.

CARLOS WITTENMYER.
FELIX J. WATTS.